United States Patent
Cassar et al.

[11] 3,708,518
[45] Jan. 2, 1973

[54] PROCESS FOR PREPARING ESTERS OF THE PARA-DIPHENYL ACETIC ACID

[75] Inventors: Luigi Cassar; Gian Paolo Chiusoli; Marco Foa, all of Novara; Giuseppe Losco, Milan; Franco Smai, Limbiate, all of Italy

[73] Assignee: Montecatini Edison S.p.A., Milan, Italy

[22] Filed: July 21, 1970

[21] Appl. No.: 56,981

[30] Foreign Application Priority Data

July 23, 1969 Italy..............................19997 A/69

[52] U.S. Cl................................................260/469
[51] Int. Cl.............................................C07c 69/76
[58] Field of Search....260/469, 493, 514 C, 468 CB, 260/671 M

[56] References Cited

UNITED STATES PATENTS 2,486,542  11/1949  Weisler et al........................260/671

OTHER PUBLICATIONS

March, "Advanced Organic Chemistry," 1968, pages 424 and 407.

*Primary Examiner*—Lorraine A. Weinberger
*Assistant Examiner*—R. S. Weissberg
*Attorney*—Stevens, Davis, Miller & Mosher

[57] ABSTRACT

A process is disclosed for preparing esters of p-diphenyl-acetic acid of the formula:

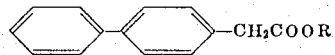

(wherein R is an alkyl or a fluoroalkyl group having from one to five carbon atoms) starting from diphenyl, and characterized in that in a first step the diphenyl is chloromethylated with $CH_2O$ and HCl, in acetic acid as a solvent, and in the presence of sulphuric or phosphoric acid as catalyst, at temperatures between 70° and 120°C and under pressures between 1 and 3 atm., and that in a second step the p-chloromethyl-diphenyl thus obtained is made to react with carbon oxide and an alkanol or a fluoro-alkanol, ROH, wherein R has the above indicated meaning, in the presence of a metal-carbonyl as catalyst and of a neutralizing agent at temperatures between 30° and 90°C and under pressures of CO between 0.5 and 2 atm., in order to obtain the desired ester. In the second step, the reaction is carried out in the presence of a solvent selected from the group consisting of the N-dialkyl amides and the alkano-nitriles, and the catalyst is a salt of cobalt hydrocarbonyl $HCo(CO)_4$ or the $Ni(CO)_4 + I^-$ system (and with 2-fluoro-ethanol and a co-solvent in the case of the latter).

3 Claims, No Drawings

PROCESS FOR PREPARING ESTERS OF THE PARA-DIPHENYL ACETIC ACID

The present invention relates to a process for preparing esters of diphenyl-acetic acid of formula (I)

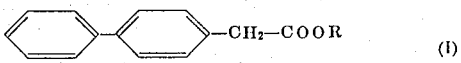  (I)

wherein R is an alkyl or fluoro-alkyl group having from one to five carbon atoms.

It is well known to obtain esters of diphenylacetic acid by treating diphenyl with acetic anhydride and aluminum chloride in order to yield methyl-diphenyl-ketone. This latter, in a subsequent step by reaction with sulphur and morpholine, forms the thiomorpholide of diphenylacetic acid, which is then saponified with NaOH in order to yield the sodium salt. From a solution of the sodium salt the free diphenyl-acetic acid is obtained by acidification with sulphuric acid. The acid thus obtained is esterified with an alcohol and the resulting ester is then purified by distillation.

The main drawbacks of this prior art process lie in the number of steps, in the low yields (particularly in the reaction with sulphur and morpholine), as well as in the relatively high cost of some of the starting materials such as the $AlCl_3$, the morpholine, etc.

According to the present invention, it has now, surprisingly, been found that there is a new and much simpler method for preparing esters of diphenyl-acetic acid in which process all the above mentioned drawbacks are overcome.

The process that forms the object of the present invention is carried out in two steps.

In the first step, the diphenyl is chloromethylated in order to obtain prevailingly p-chloromethyl-diphenyl according to the reaction:

(1)

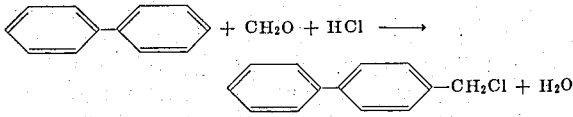

In the second step, the p-chloromethyl-diphenyl is made to react with carbon oxide and with an alkanol or a fluoro-alkanol ROH (wherein R has the above-indicated meaning), in order to obtain the ester of diphenyl-acetic acid according to reaction (2):

(2)

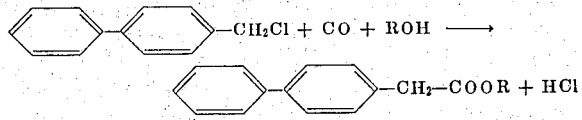

The chloromethylation (first step) is carried out according to the present invention in acetic acid as a solvent, at temperatures between 70° and 120°C and under a pressure of from 1 to 3 atm., and in the presence of a strong mineral acid (sulphuric or phosphoric acid) as a catalyst.

The hydrochloric acid may be employed either as a concentrated aqueous solution or as a gas, or it may be prepared in situ from sodium chloride and sulphuric acid.

The formaldehyde may be employed either as a concentrated aqueous solution or as a solid polymer such as trioxane or para-formaldehyde.

For each mole of diphenyl from 1 to 5 moles respectively of acetic acid, formaldehyde, hydrochloric acid and acid catalyst are employed.

At the end of the reaction (i.e. after 4–24 hours) the raw mixture is diluted with water (maximum one volume of water for one volume of mixture) and is then extracted with an organic solvent immiscible with water and selected from the group consisting of chloroalkanes, ethers and arenes. The extract is then washed with a preferably saturated aqueous $NaHCO_3$ solution, and is then evaporated in order to eliminate the solvent.

The residue from the evaporation contains the products of the chloromethylation (i.e., para- and ortho-chloromethyl-diphenyl and dichloromethyl-diphenyls) and the non-reacted diphenyl. This residue may be used as such in the second step or it may be rectified in order to separate the p-chloromethyl-diphenyl having a purity of 98–99 percent.

In the second step (reaction 2), the p-chloromethyl-diphenyl is converted into the desired diphenyl-acetic ester by reaction with carbon oxide and ROH, in the presence of a metal-carbonyl as a catalyst.

In this second step the reaction is carried out at between 30° and 90°C and under a pressure of CO between 0.5 and 2 atm.

The alkanol or the fluoroalkanol (ROH) is preferably employed in large excess in order that it may act also as a solvent; as a solvent the latter may be substituted by an N-dialkyl-amide or by an alkanonitrile.

The hydrochloric acid that is formed during the reaction is taken up or blocked by any suitable neutralizing agent (such as ammonia, alkyl-amine, magnesium oxide, calcium carbonate, etc.).

As catalyst one may use a salt of cobalt hydrocarbonyl, $HCo(CO)_4$, such as the sodium salt or the ferrous salt, or the $Ni(CO)_4 + I^-$ system, wherein the $I^-$ ion is supplied by elemental iodine or by an iodide such as NaI, $NiI_2$, etc.

When using the $Ni(CO)_4 + I^-$ system it is preferable to use a co-solvent (amide, nitrile) in order to increase the yield and reduce the consumption of catalyst.

For each mole of chloromethyl-diphenyl there are used from 1 to 40 moles of alkanol, from 0.01 to 0.1 moles of metal carbonyl and from 0.8 to 1.2 moles of neutralizing agent. The iodine, as $I^-$, amounts to about half the Ni.

At the end of the reaction, the excess alkanol and the co-solvent are recovered by distillation; water is then added to the residue and the organic part, consisting of 92–94 percent of the desired p-phenyl acetic ester, is then extracted by means of a solvent.

As by-products the following compounds are found to be present (in percent by weight of the mixture):

(II)

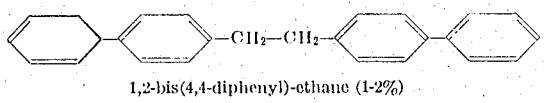

1,2-bis(4,4-diphenyl)-ethane (1-2%)

(III)

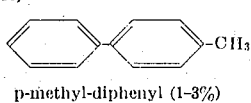

p-methyl-diphenyl (1-3%)

(IV)

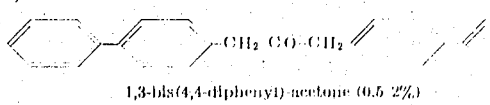

1,3-bis(4,4-diphenyl)-acetone (0.5-2%)

(V)

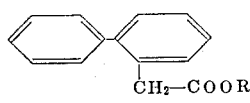

o-diphenyl-acetic ester (1–2%)

When using the raw residue of the chloromethylation instead of the pure para-chloromethyl-diphenyl in the second step, at the end of the carbonylization the extract is rectified in order to obtain the desired p-diphenyl-acetic ester in pure form.

The present invention thus turns out to be very convenient for the preparation of fluorinated esters of p-diphenyl-acetic acid which are known acaricides, and more particularly for the preparation of the 2-fluoroethylic ester which may be obtained by the direct carbonylization from p-chloromethyl-diphenyl with 2-fluoro-ethanol, or the methyl or ethyl ester (I) is prepared according to reactions (1) and (2), and is then trans-esterified with 2-fluoro-ethanol.

The following examples are given for purely illustrative and non-limiting purposes.

EXAMPLE I

Into a 10 liter flask provided with a stirrer, a water reflux cooler and a thermometer were charged:

| | |
|---|---|
| diphenyl, melting point 70°–71°C | 1542 g (10 M) |
| paraformaldehyde | 550 g (18.3 M) |
| HCl, concentrated (37%) | 2150 ml (21.8 M) |
| phosphoric acid (85%) | 2475 ml |
| glacial acetic acid | 1300 ml |

This mixture was heated up to 100°C and was maintained at this temperature under constant stirring for 8 hours. Thereupon were added 2 liters of water. The mixture was then extracted with 1,500 ml of chloroform and the extract was then washed with 2 × 500 ml of a saturated $NaHCO_3$ solution. The extract was then dried on $CaCl_2$ and finally rectified, thereby obtaining 700 g of p-chloromethyl-diphenyl at 99 percent (boiling point: 152°–154°C/3 Torr).

As reactor for the carbonylization there was used a five-necked 2 liter flask provided with a stirrer, two graduated 200 cc feeding funnels, a thermometer, a reflux cooler refrigerated by $NH_3$ and connected to a 10 liter Mariotte bottle containing CO under a head of brine. Into the flask were introduced:

| | |
|---|---|
| dimethyl-formamide (DMF) | 750 ml |
| 2-fluoro-ethanol | 280 ml (4.38 M) |
| sodium iodide | 9.6 ml (60 mM) |
| nickel carbonyl | 25 ml (195 mM) |

The solution, under thorough stirring, was then brought up to 79°C and over a period of 6 hours a mixture, liquid at 65°C, of p-chloromethyl-diphenyl (380 g = 1.88 M), 10 cc of DMF and, contemporaneously, triethylamine (266 ml = 1.88 M), was added dropwise so as to have always in solution the stoichiometric quantity of the two reactants. Thereupon the solution was kept under stirring for another hour. On the whole there were absorbed 37.0 liters of CO.

At the end of the reaction the mixture was degassed with nitrogen in order to eliminate all of the unaltered $Ni(CO)_4$. Thereupon it was subjected to distillation for the removal of the beta-fluoroethyl alcohol and the dimethylformamide. For this purpose the distillation was carried out under a gradually increasing vacuum, from 200 Torr to 20 Torr, and with a final temperature of 100°C.

In this way there were recovered 880 g of a mixture containing 76.6 percent of DMF and 23.4 percent of fluoro-ethanol.

The residue was then diluted with 500 ml of water, acidulated with 5 ml of $H_2SO_4$, and then extracted with 500 ml of chloroform.

The chloroform extract was then washed with a solution saturated by sodium bicarbonate dried on $CaCl_2$ and evaporated to dryness after there had been admixed therewith 2.0 g of methyl-ethyl-pyridine as a stabilizer. The residue of 440 g showed the following composition by weight:

| | |
|---|---|
| I fluoro-ethyl ester of p-diphenyl-acetic acid | 93.0 % |
| II 1,2-bis(4,4-diphenyl)-ethane | 1.5 % |
| III p-methyl-diphenyl | 1.0 % |
| IV 1,3-bis(4,4-diphenyl)-acetone | 1.0 % |
| V 2-methyl-3-ethyl-pyridine | 0.5 % |

EXAMPLE II

Into a 250 ml flask provided with a stirrer, 2 graduated 100 ml feeding funnels, a thermometer and a reflux cooler refrigerated with ammonia, there were introduced:

| | |
|---|---|
| acetonitrile | 80 ml |
| iodine | 0.81 g ( 3.19 mM) |
| nickel carbonyl | 2.9 ml (22.6 mM) |
| 2-fluoro-ethanol | 40 ml ( 0.695 M) |

The solution, well stirred and under a head of carbon oxide (CO), was brought up to 77°C. Thereupon there were added to it, by dripping over a period of 4 hours, p-chloromethyl-diphenyl (45 g = 0.225 M) and triethylamine (35 ml = 0.249 M), so as to have the triethylamine present in excess by 10 percent with respect to stoichiometric. In 5 hours 3,600 ml of carbon oxide were absorbed.

The raw mixture was then processed as in Example I and there were thus obtained 55 g of a neutral fraction consisting of p-diphenyl-fluoroethyl acetate (93 percent).

EXAMPLE III

Into a 1 liter flask provided with a stirrer and a reflux cooler and a feeding funnel, there were introduced:

| | |
|---|---|
| diphenyl | 154.2 g (1 M) |
| paraformaldehyde | 55 g (1.83 M) |
| HCl concentrated (37%) | 215 g (2.18 M) |
| $H_3PO_4$ (85%) | 247.5 ml |
| glacial acetic acid | 130 ml |

The temperature was then brought up to 110°C and the mixture was maintained at this temperature under constant stirring for 8 hours. The mixture was thereupon cooled down to 30°–40°C and the upper organic layer was separated from the lower aqueous layer (which was recycled to the subsequent chloromethylation reaction after the addition of $CH_2O$ and HCl).

The organic layer was then diluted with 200 ml of methylene chloride, washed with an aqueous solution of sodium bicarbonate, dried on $Na_2SO_4$, and finally evaporated to dryness. The raw residue (195.3 g) of the chloromethylation reaction was then added over a period of 4 hours, contemporaneously with 90 ml of triethylamine, to a solution of:

| | |
|---|---|
| dimethylformamide | 400 ml |
| methanol | 100 ml |
| nickel carbonyl | 10 ml |
| sodium iodide | 4.0 g |

This raw product was processed as in Example I. The neutral fraction (190 g) was distilled and 100 g of p-diphenyl-methyl acetate (b.p. = 150°C/1 Torr) were obtained.

The methyl ester may easily be transesterified with fluoroethyl alcohol in order to yield the corresponding fluoroethyl ester. For 100 g of the methyl ester, 90 g of fluoroethanol and 1 g of p-toluenesulphonic acid were used. This mixture was reflux-boiled for 11 hours, removing from the top the methanol as it formed; there were than added 0.5 g of collidine as a stabilizer and the excess fluoroethanol was recovered by distillation under reduced pressure.

The residue (100 g) consisted (93 percent) of the fluoroethyl ester of diphenyl-acetic acid.

EXAMPLE IV

Into a 1 liter flask provided with a stirrer, a feeding funnel and a thermometer, there were introduced 600 ml of methanol, 3.0 g of NaCo(CO)$_4$ and 4.5 g of MgO. The mixture was then brought up to 50°C and over a period of 2 hours there were added 100 g of raw residue of the chloromethylation reaction as obtained in Example III.

This mass was then left to react for another hour. In this way 5.5 liters of carbon oxide (CO) were absorbed.

The neutral fraction (100 g) was then distilled, yielding 50 g of p-diphenyl-methyl acetate (b.p. 150°C/1 Torr), which was thereafter transesterified as in Example III in order to yield 55 g of p-diphenyl-fluoroethyl acetate.

What is claimed is:

1. A process for preparing an ester of p-diphenyl-acetic acid of the formula:

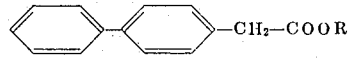

wherein R is an alkyl or a fluoroalkyl group having from one to five carbon atoms, comprising in a first step chloromethylating diphenyl with CH$_2$O and HCl, in acetic acid as a solvent, and in the presence of sulphuric or phosphoric acid as catalyst, at temperatures between 70° and 120°C and under pressures between 1 and 3 atm., and in a second step reacting the p-chloromethyl-diphenyl thus obtained with carbon monoxide and an alkanol or a fluoro-alkanol, ROH, wherein R has the above-indicated meaning, in the presence of a cobalt or nickel carbonyl as catalyst and of a hydrogen chloride neutralizing agent at temperatures between 30° and 90°C and under pressures of CO between 0.5 and 2 atm., in order to obtain the desired ester.

2. A process according to claim 1, wherein in the second step the reaction is carried out in the presence of a solvent selected from the group consisting of the N-dialkyl amides and the alkano-nitriles.

3. A process according to claim 1, wherein the catalyst of the second step is a salt of cobalt hydrocarbonyl HCo(CO)$_4$ or the Ni(CO)$_4$ + I$^-$ system.

* * * * *